United States Patent [19]

Hirota et al.

[11] Patent Number: 4,740,434
[45] Date of Patent: Apr. 26, 1988

[54] SURFACE TREATED ELECTRODES APPLICABLE TO ZINC-HALOGEN SECONDARY BATTERIES

[75] Inventors: Akihiko Hirota, Tokyo; Kazuo Fushimi, Saitama; Toshinobu Fujii, Tokyo, all of Japan

[73] Assignee: Kabushiki Kaisha Meidensha, Tokyo, Japan

[21] Appl. No.: 935,343

[22] Filed: Nov. 26, 1986

[30] Foreign Application Priority Data

Nov. 29, 1985 [JP] Japan .............................. 60-267414
Mar. 4, 1986 [JP] Japan ................................. 61-45435

[51] Int. Cl.$^4$ ............................................. H01M 4/96
[52] U.S. Cl. ................................... 429/105; 429/199; 429/209
[58] Field of Search ............... 429/101, 105, 199, 209, 429/42, 44, 218

[56] References Cited

U.S. PATENT DOCUMENTS

| | | | |
|---|---|---|---|
| 4,346,150 | 8/1982 | Bellows et al. | 429/101 X |
| 4,482,614 | 11/1984 | Zito, Jr. | 429/101 X |
| 4,505,994 | 3/1985 | Shimada et al. | 429/101 |
| 4,614,693 | 9/1986 | Hashimoto et al. | 429/105 X |

*Primary Examiner*—Anthony Skapars

*Attorney, Agent, or Firm*—Bachman & LaPointe

[57] ABSTRACT

A surface treated electrode applicable to an electrode of a zinc-halogen secondary battery, etc. The surface plastic electrode includes (a) an electrically conductive electrode substrate material; and (b) a surface treatment material on the electrode substrate material, the surface treatment material being made of a phenol resin series activated charcoal fiber satisfying predetermined characteristic such that a weight per unit area substantially equal to 100 g/m$^2$ or more, pore diameter having a distribution peak in a range from 1.5 nm to 3.5 nm, a surface area of a part substantially equal to or more than 30 m$^2$/g occupied by pores whose diameters range from 1 nm to 11 nm, a whole relative surface area of the entire pore diameter ranging substantially equal to or more than 1500 m$^2$/g, a tensile strength substantially equal to or more than 294 MPa (30 kg/mm$^2$) and a tensile modulus substantially equal to or less than 14710.5 MPa (1500 kg/mm$^2$). The conductive electrode substrate material is, for example, carbon plastic, glassy carbon, or Carbon-Carbon (C/C) composite. In the case of the C/C composite electrode substrate material, an ion exchange fiber is adhered onto one surface of the C/C composite electrode substrate material to form a three-layer type electrode.

20 Claims, 3 Drawing Sheets

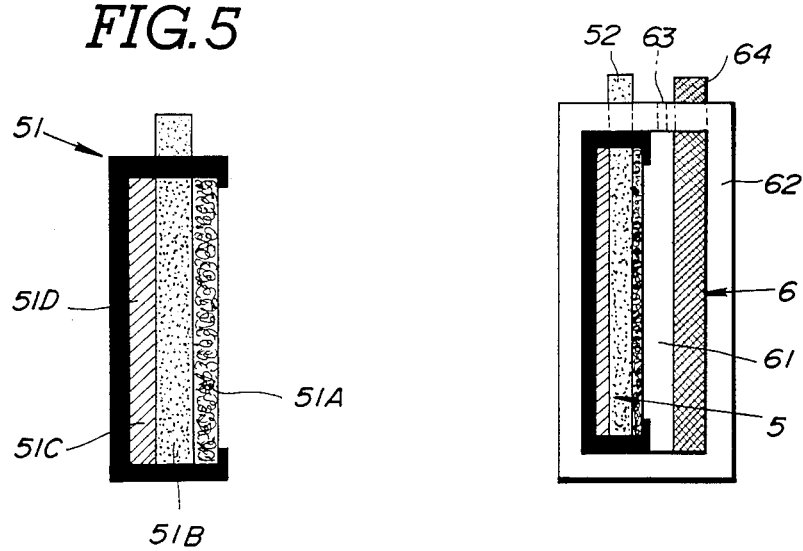
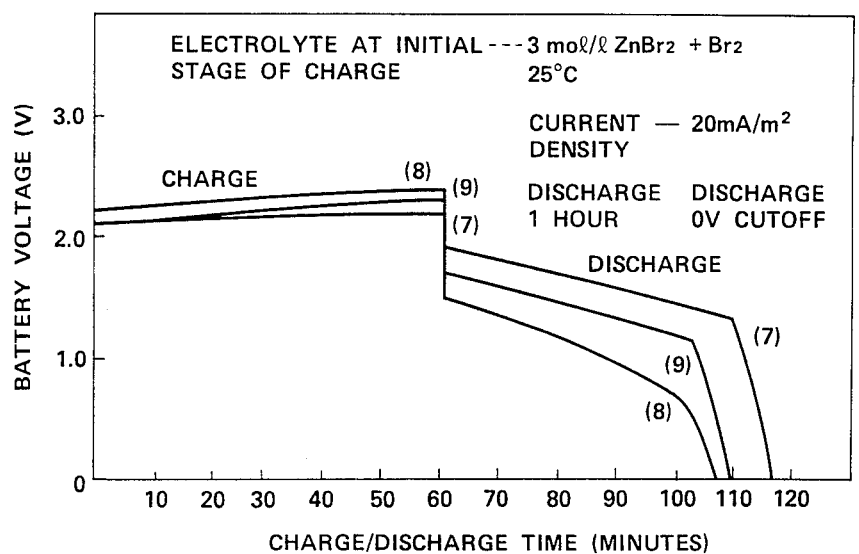

SURFACE TREATED ELECTRODES APPLICABLE TO ZINC-HALOGEN SECONDARY BATTERIES

BACKGROUND OF THE INVENTION

The present invention relates to surface treated electrodes particularly applicable to positive electrodes of zinc-halogen secondary batteries such as zinc-bromine secondary batteries and so on. The present invention particularly relates to the surface treated electrodes in which active carbon (activated charcoal) fibers whose originating raw materials are phenol formaldehydes are adhered onto conductive electrode substrates, for example, under mechanical pressure and heat or attached thereto.

Carbon fibers are effective materials as materials for surface treatments of positive electrodes in zinc-halogen secondary batteries. An electrode under a surface treatment has conventionally been used with such a carbon fiber as belonging to cloth-formed rayon and acryl series adhered onto a surface of a carbon plastic (C.P) under mechanical pressure and heat.

However, such carbon fibers as belonging to the rayon and acryl series in the above-described cloth forms have problems in their activation processing methods so that sufficient activations in zinc-halogen secondary batteries, especially in zinc-bromine secondary batteries cannot yet be achieved.

That is to say, since an area of a part occupied by pores having diameters of 1 to 11 nm required for a positive electrode reaction in the above-described electric secondary batteries is not yet formed in a sufficient quantity to carry out the positive electrode reaction in the above-described carbon fibers, an over voltage becomes remarkably large when the charge and discharge operations are carried out especially in high current densities equal to or more than 60 mA/cm$^2$.

In addition, since the above-described carbon fibers have small weights per unit area in a unit of sheet (referred to as a METSUKE in Japanese and this unit is g/m$^2$ in Japan and lb/yd$^2$ in England), are thin in thickness, and weak in mechanical strength such as tensile and bending strengths, they cannot withstand a high mechanical pressure under which they are adhered onto the carbon plastics (C.P) by heat pressing operation, many such carbon fibers are destroyed to become powders and to become short length fibers during this process so that they drop off electrode surfaces. Consequently, electrochemical performances of the zinc-bromine secondary batteries will greatly be reduced.

SUMMARY OF THE INVENTION

With the above-described problems in mind, it is an object of the present invention to provide surface treated electrodes which improve battery characteristics in batteries whose electrodes according to the present invention are used and have a high mechanical strength.

It is another object of the present invention to provide the surface treated electrodes applicable to positive electrodes of zinc-halogen secondary batteries such as zinc-bromine secondary batteries which improve the battery characteristics in the zinc-halogen secondary batteries and have the high mechancal strength, both required for the zinc-halogen secondary batteries.

The above-described objects can be achieved by providing a surface treated electrode, comprising: (a) an electrically conductive material constituting a substrate of the electrode; and (b) a surface treatment material on the conductive electrode substrate material, the surface treatment material being made of phenol resin series activated charcoal fiber satisfying predetermined characteristics.

The predetermined characteristics are specifically a weight per unit area of 100 g/m$^2$ or more, pore diameters having a distribution peak substantially in a range from 1.5 nm to 3.5 nm, a surface area of a part equal to or more than 30 m$^2$/g occupied by pores whose diameters substantially range from 1 nm to 11 nm, a whole surface area of pore diameter range equal to or more than 1500 m$^2$/g, a tensile strength substantially equal to or more than 294 MPa (30 kg/mm$^2$), and a tensile modulus substantially equal to or less than 14710.5 MPa (1500 kg/mm$^2$).

The invention performed experiments on battery characteristics using various kinds of activated charcoal fibers for carrying out surface treatments on electrode substrates such as carbon plastic electrode substrates. The experiments used an activated charcoal fiber belonging to phenol resin series (novoloid of a phenol formaldehyde) adhered onto a conductive electrode substrate surface. The electrode whose surface is treated in this way is used as a positive electrode of the zinc-halogen secondary battery and it is more advantageous in its battery characteristics and mechanical strength than the case where the cloth formed activated charcoal fibers such as those belonging to the rayon, cellulose, and acryl series are used as surface treatment materials of electrode substrates and they are used for positive electrodes of the zinc-halogen secondary batteries.

The present invention is also applicable to electrodes of other zinc-halogen secondary battery.

The activated charcoal fibers in resin series are manufactured, e.g., by melt spinning phenol resins (novoloids of phenol formaldehyde) and thereafter activating and sintering them under vaporized water.

The activated charcoal fibers whose originating raw materials are phenol formaldehydes are, for example, kynol activated charcoal fibers manufactured by Nihon Kynol Company Limtied, Cloth-ACC series and Felt ACN series.

BRIEF DESCRIPTION OF THE DRAWINGS

FIG. 5 is a cross sectional view of an electrode having a three-layer construction in the surface treated electrode in a fourth preferred embodiment.

FIG. 6 is a cross sectional view of a liquid static type secondary battery in a fifth preferred embodiment.

FIG. 7 is a characteristic graph representing a relationship between a charge-discharge duration and battery voltage.

DETAILED DESCRIPTION OF THE PREFERRED EMBODIMENTS

Reference will hereinafter be made to the drawings in order to facilitate understanding of the present invention. Before explaining preferred embodiments according to the present invention, a construction of a zinc-bromine secondary battery will briefly be described.

Figure 1:
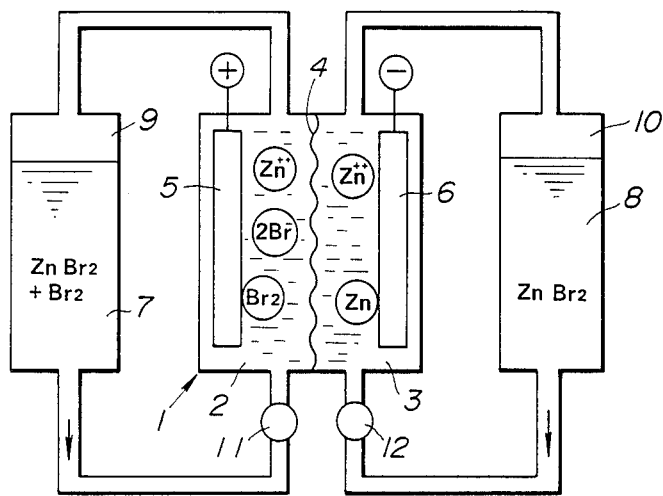
FIG. 1 shows a basic construction of a zinc-bromine secondary battery to which a surface treated electrode according to the present invention is applicable.

FIG. 1 shows a basic construction of a zinc-bromine secondary battery to which a surface treated carbon plastic electrode according to the present invention is applicable.

As shown in FIG. 1, a positive electrode 5 and a negative electrode 6 are separated mutually by a separation member constituted by, e.g., a microporous sheet or ion exchange membrane, denoted by numeral 4, for providing independent electrochemical reactions in each of positive and negative electrode chambers 2, 3. Positive and negative electrolytes for both positive and negative electrode chambers 2, 3 are stored within external electrolyte storage tanks 7, 8, respectively. When charge and discharge of a secondary unit cell generally denoted by 1 are carried out, each electrolyte is supplied to the corresponding electrode chamber 2, 3 by means of corresponding pumps 11, 12 intervened in a lower conduit disposed between the corresponding storage tanks 7, 8 and electrode chambers 2, 3. As the electrolyte for the positive electrode 5, e.g., an aqueous solution of $ZnBr_2$ plus bromine molecule ($Br_2$) and bromine complexing agent are used. The addition of the complexing agent contributes the bromine molecule in the positive electrolyte to be changed to a low vapor pressure, low water soluble oily bromine complex.

When the discharge action is carried out, $ZnBr_2$ solution including bromine complex is introduced into the positive electrode chamber 2 by means of the pump 11. In the positive electrode 5, bromine complex is reduced to $Br^-$ ion. On the other hand, in the negative electrode 6 on which zinc is electrodeposited, $ZnBr_2$ solution is introduced by means of the pump 12 and zinc is oxidized to $Zn^{++}$ ion. When the charge action is carried out, bromine molecule is generated in the positive electrode 5 ($2Br^- \rightarrow Br_2 + 2e^-$) and zinc is electrodeposited in the negative electrode 6 ($Zn^{++} + 2e^- \rightarrow Zn$). The electrochemical reaction in the zinc-bromine secondary battery is expressed as follows:

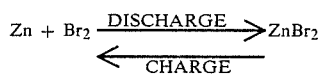

The construction and reaction of the zinc-bromine secondary battery are described by a U.S. Pat. No. 4,461,817 published on July 24, 1984 and U.S. Pat. No. 4,510,218 published on Apr. 9, 1985. The U.S. Patent documents are hereby incorporated by reference.

Before explaining preferred embodiments, Table 1 shows lists of article numbers of activated charcoal fiber sheets used in the preferred embodiments and their characteristics.

TABLE 1 characteristics of eleven sheets (A through G and M through Q) of positive electrode surface treatment materials

| Symbols of Electrodes | Surface Treatment Materials | Weight per unit area (g/m²) | Thickness (mm) | Surface area (m²/g) | pore diameter of fiber (nm) | form |
|---|---|---|---|---|---|---|
| A E | ACC507-15 Nihon Kynol Co., Ltd. | 135 | 0.53 | 1500 | 1.5–3.5 | cloth |
| B | ACC507-20 Nihon Kynol Co., Ltd. | 115 | 0.44 | 2000 | 1.5–3.5 | cloth |
| C | ACN210-15 Nihon Kynol Co., Ltd. | 120 | 2.10 | 1500 | 1.5–3.5 | felt |
| D | ACN210-20 Nihon Kynol Co., Ltd. | 100 | 2.20 | 2000 | 1.5–3.5 | felt |
| G | ACC509-20 Nihon Kynol Co., Ltd. | 175 | 0.60 | 2000 | 1.5–3.5 | cloth |
| M | KF-M-203 Toyobo Inc. | 44 | 0.25 | 1500 | 1.5–2.0 | knit |
| N, O, Q | KF-M-303 Toyobo Inc. | 82 | 0.48 | 1600 | 1.5–2.0 | cloth |
| P | FE-400 Toho Rayon Inc. | 60 | — | 1100 | 0.8–2.0 | felt |

FIRST PREFERRED EMBODIMENT

The inventors investigated respective discharge characteristics of the plurality of zinc-halogen secondary batteries using the same electrolytes, each having a concentration of 3 mol/l $ZnBr_2$ + $Br_2$ (0.4 to 1.0 mol/l). Their positive electrodes were formed of surface treated carbon plastic (C.P) electrodes, each having a weight ratio of P.E. : C.B (P.E denotes a polyethylene and C.B denotes a carbon black) being 100:50. At this time, four kinds of activated charcoal fiber sheets selected from among phenol resin series activated charcoal fibers (manufactured by Nippon Kynol Company Limited) shown in Table 1 and two kinds of activated charcoal fibers selected from among rayon series activated charcoal fiber sheets (manufactured by Toyobo Incorporation) shown in Table 1 were adhered as surface treatment materials onto the carbon plastic electrodes under mechanical pressure and heat, respectively. In this way, the six surface treated carbon plastic electrodes A through D, M and N were formed.

Figure 2:
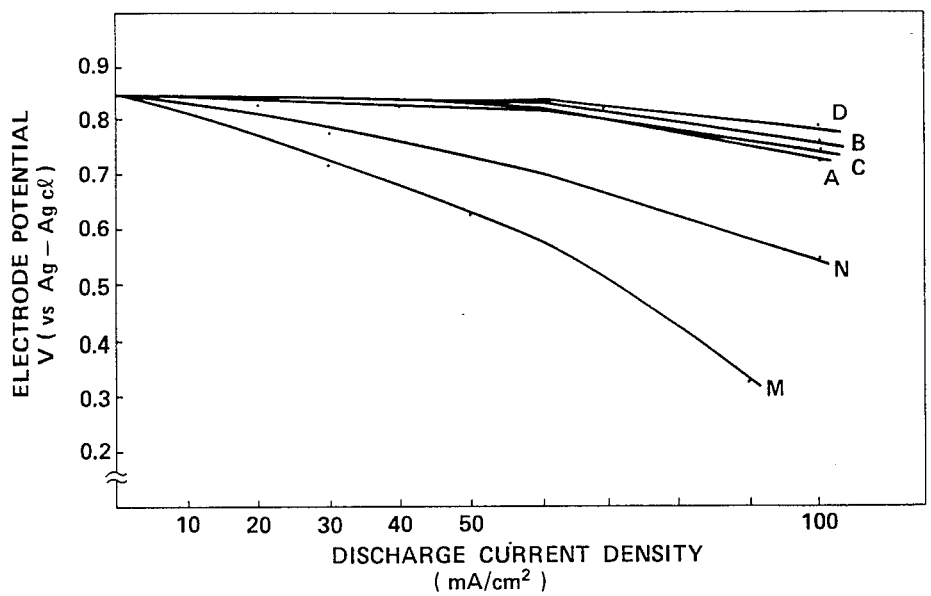
FIG. 2 is a characteristic graph representing a relationship between an electrode potential and discharge current density in the surface treated carbon plastic electrode in a first preferred embodiment according to the present invention.

In addition, FIG. 2 shows the experimental results of discharge characteristics of the carbon plastic electrodes (A through D, M and N) whose surfaces were respectively treated with these activated charcoal fibers.

As appreciated from FIG. 2, the electrodes A through D treated with the phenol resin series activated charcoal fiber sheets have better discharge characteristics than the electrodes M and N treated with the two kinds of rayon series activated charcoal fibers.

Especially, although the activated charcoal fiber sheet of article number KF-M-303 in the cloth form used for the electrode N was substantially the same as the phenol resin series activated charcoal fiber sheet of ACC507-15 used in the electrode A in both relative surface area (m²/g) and cloth form as shown in Table 1, the discharge characteristics thereof became considerably lower than ACC507-15 as shown in FIG. 2. This may be caused by differences in the weight per unit area in the unit of fiber and in thickness as estimated from Table 1.

SECOND PREFERRED EMBODIMENT

The inventors prepared two different carbon plastic electrodes E and O from the same carbon plastics (C.P.U) [each having a weight ratio of P.E (polyethylene)/C.B. (carbon black)/G (graphite)=50/15/35]. For their surface treatment materials, two kinds of activated charcoal fibers, i.e., ACC507-15(E) and KF-M-303(O) were selected from among six kinds of activated charcoal fibers which were used in the first preferred embodiment and adhered onto the respective surfaces of the carbon plastics under pressure of 5.88 MPa (60 kg/cm²) and temperature of 140° C. for three minutes using a metallic die used for manufacturing the electrodes.

Table 2 shows several characteristics of the above-described electrodes E and O.

Figure 3:
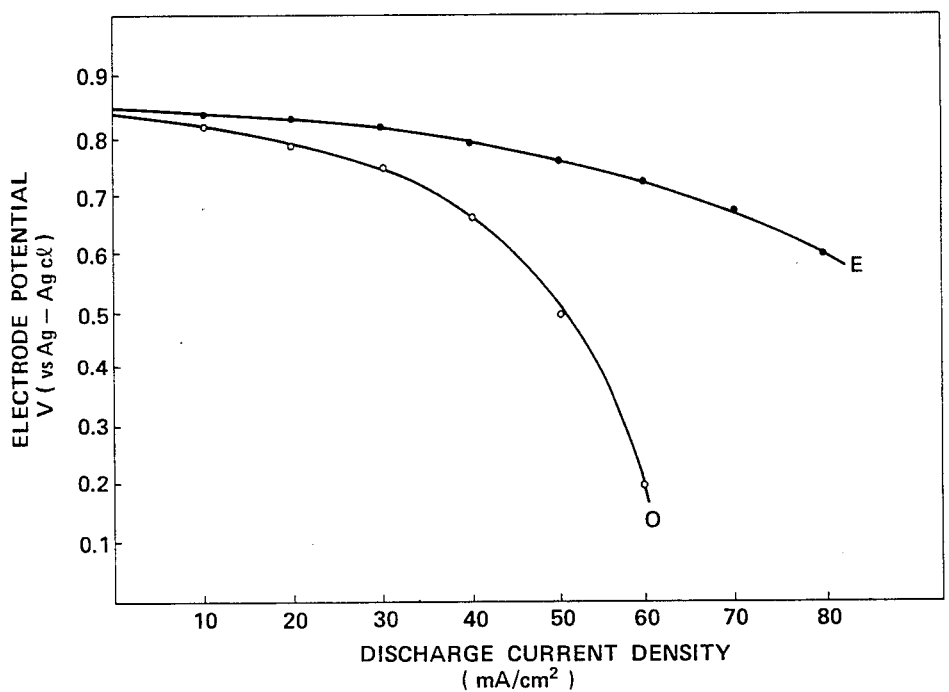
FIG. 3 is a characteristic graph representing the relationship between the electrode potential and discharge current density in the surface treated electrode in a second preferred embodiment according to the present invention.

FIG. 3 shows respective discharge characteristics thereof. It is noted that requirements for the electrolyte are the same as those in the case of the first preferred embodiment.

TABLE 2

Characteristics of electrode E and electrode O

| | Thickness*³ (mm) | Relative Resistance (Ω-cm) | Surface*⁴ Area (m²/g) | Tensile*⁵ Strength (kg/mm²) |
|---|---|---|---|---|
| E*¹ | 1.50 | 0.168 | 995 | 315 |
| O*² | 1.33 | 0.154 | 330 | 316 |

*¹ACC507-15 is used for the surface treatment material of the electrode
*²KF-M-303 is used for the surface treatment material of the electrode
*³The C.P.U of the electrode substrate has a thickness of about 1.0 mm
*⁴Relative surface area including electrode substrate (B.E.T (Brunauer, Emmett, Teller) method)
*⁵kg/mm² = 9.807 MPa As appreciated from Table 2, although there is little difference between the electrodes E and O in their thickness and relative resistance values, the electrode E is larger than the electrode O in their surface areas including the electrode substrates. This may be caused by their weights per unit area and mechanical strengths (tensile strength) of the activated charcoal fibers of the surface treatment materials and by the fact that the electrode E using the activated charcoal fiber of (E) ACC507-15 having both greater weight per unit area and higher mechanical strength (tensile strength) is sealed to the electrode surface with little destruction of fibers during the pressure and heat adhering process.

THIRD PREFERRED EMBODIMENTS

In this embodiment, the inventors prepared the three unit cell type zinc-bromine secondary batteries each having an interelectrode distance of 10 mm without separation member and constituted by the respective positive electrodes of B, D, and N used in the first preferred embodiment, negative electrodes of Zn plates, and electrolytes of 3 mol/l ZnBr₂. In addition, the secondary batteries have charged for one hour with the current density of 20 mA/cm². After the charge operation, each electrolyte was renewed with 3 mol/l ZnBr₂. Then the secondary batteries were discharged with the same current density to discuss holding capacities of bromine of the respective positive electrodes. The results of the holding capacities are shown in FIG. 4.

Figure 4:
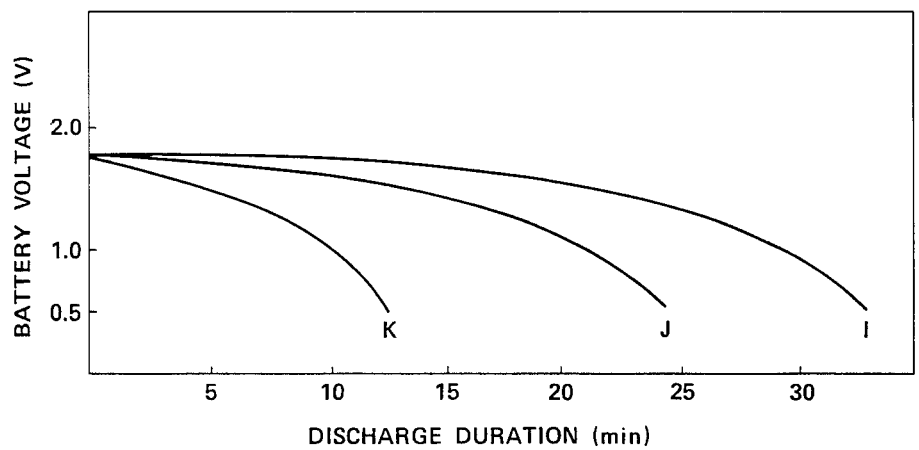
FIG. 4 is a characteristic graph representing the relationship between a discharge duration and battery voltage of the surface treated electrode in a third preferred embodiment according to the present invention.

FIG. 4 shows change patterns of discharge voltages with respect to a discharge duration in minutes.

As shown in FIG. 4, one of the batteries I in which ACN210-20 was used as the positive electrode surface treatment material of the electrode D indicated a higher discharge voltage and a longer discharge duration than the battery J in which ACC507-20 was used as the positive electrode surface treatment material of the electrode B. In addition, the battery J had a better characteristic than the battery K in which KF-M-303 was used as the positive electrode surface treatment material of the electrode N.

Consequently, as the surface area of the activated carbon fiber sheet is increased, the activated carbon fibers indicate better characteristics.

Next, other electrodes in which the activated charcoal fibers made of novoloid fibers of phenol resin series as the originating raw materials are surface treatment materials of the positive electrodes in the same way as described in the first, second, and third preferred embodiments and carbon series composite materials which are different from the carbon plastics used in the first, second, and third preferred embodiments are used as the conductive electrode substrate materials indicated superior characteristic in the zinc-halogen secondary batteries. The following fourth and fifth preferred embodiments indicate superior characteristics of the zinc-halogen secondary batteries in which the other electrodes as described above were used.

FOURTH PREFERRED EMBODIMENT

The inventors selected three kinds of activated charcoal fibers from those shown in Table 1 and adhered them to glassy carbons GCR 101 (article number and manufactured by Kobe Seiko Kabushikikaisha) to discuss comparisons of electrode activites due to a difference in the electrode surface treatment materials.

The adhering method is such that a sheet of each of the activated charcoal fibers is laminated via a conductive carbon paste on the corresponding conductive electrode substrate and burned.

Then, three unit cells were prepared in which the electrode P comprising FE-400 and GCR 101, the electrode Q comprising KF-M-303 and GCR 101, and the electrode G comprising ACC 509-20 and GCR 101 were used as the respective positive electrodes and GCR 101 was used for each negative electrode, and RAI manufactured by Asahi Kasei Kabushikikaisha was used for each microporous sheet constituting the separation member. Each unit cell zinc-bromine secondary battery was charged for eight hours with the current density of 15 mA/cm² and was discharged with the same current density. Thereafter, the inventors compared and discussed each battery characteristic.

The result of each battery characteristic is shown in Table 3.

TABLE 3

Performance of each battery (4), (5) and (6)

| Battery (No) | Kinds of positive and negative electrodes | Voltaic*¹ Efficiency | Coulombic*² Efficiency | Energy Efficiency | Remarks |
|---|---|---|---|---|---|
| Battery | Electrode | 91.4% | 90.5% | 82.7% | 15 A/cm² |

TABLE 3-continued

Performance of each battery (4), (5) and (6)

| Battery (No) | Kinds of positive and negative electrodes | Voltaic[*1] Efficiency | Coulombic[*2] Efficiency | Energy Efficiency | Remarks |
|---|---|---|---|---|---|
| (4) | (G) GCR 101 | | | | 8 hour charge |
| Battery (5) | Electrode (P) GCR 101 | 82.1% | 81.0% | 66.5% | |
| Battery (6) | Electrode (Q) GCR 101 | 86.5% | 82.8% | 71.6% | |

[*1] The discharge voltage at 0.5 volt cut off corresponds to an intermediate point of the discharge duration.
[*2] The discharge duration is an interval of time until 0.5 V cut off.

It is noted that the electrolyte used as 3 mol/l $ZnBr_2$ with which a bromine complexing agent is mixed and furthermore 4 mol/l $NH_4Cl$ is added to improve conductivity. The electrolyte is recirculated as described before with reference to FIG. 1.

As appreciated from Table 3, the battery (4) in which the electrode G to which ACC 509-20 was adhered had superior characteristic in terms of each efficiency to the other batteries (5) and (6).

FIFTH PREFERRED EMBODIMENT

FIG. 5 shows a cross sectional view of a three-layer type electrode.

FIG. 6 shows a cross sectional view of a liquid static type unit cell of zinc-bromine secondary battery.

As shown in FIG. 5, the inventors selected three kinds of the activated charcoal fibers, i.e., FE-400, KF-M-303, and CC 509-20 shown in Table 1 as the activated charcoal fiber sheet 51 of the surface treatment materials. Each of these activated charcoal fiber sheet 51A was brought in contact with PP-444 manufactured by Nikken Giken Kabushikikaisha as C/C composite 51B (Carbon-Carbon composite) in the carbon series composite material. In addition, an ion exchange membrane 51C was adhered to a surface of the C/C composite 51B (PP-444) opposite to one of the activated charcoal fibers 51A to form the three-layer type electrode 51. It is noted that numeral 51D denotes a mold resin. Such a three-layer type electrode 51 provides a holding effect of a halogen molecule $Br_2$ and so on. The inventors prepared the liquid static type unit cell of zinc-bromine secondary battery in which the above-described three-layer type electrode 51 was used as the positive electrode 5 and a zinc plate (a rolled zinc plate having a purity of 99.99%) was used as the negative electrode 6, as shown in FIG. 6. It is noted that, in FIG. 6, numeral 61 denotes the electrolyte (3 mol/l $ZnBr_2+Br_2$), numeral 62 denotes an outer envelope made of a mold resin, numeral 52 denotes a lead terminal of the positive electrode 5, numeral 64 denotes a lead terminal of the negative electrode 6, and numeral 63 denotes an entrance of the electrolyte 61.

The three kinds of batteries (7), (8) and (9) prepared in the way described above were charged for one hour with one current density of 15 mA/cm$^2$ and discharged with the same current density.

Table 4 and FIG. 7 show each battery characteristic of the three kinds of batteries (7), (8), and (9). It should be noted that the discharge voltage was zero volt when the discharge operation is ended.

As shown in Table 4 and FIG. 7, the battery (7) in which ACC 509-20 is used as a surface treatment material has a longer duration time than the other two kinds of batteries (8) and (9) and operates with superior values of the charge and discharge voltages to those of the other batteries (8) and (9).

TABLE 4

Characteristics of Batteries (7), (8) and (9)

| Battery No. | Battery (7) | Battery (8) | Battery (9) |
|---|---|---|---|
| Kinds of Activated Charcoal Fibers Used in Positive Electrode | ACC509-20 | Fineguard FE-400 | KF-M-303 |
| Voltage (V) at Initial Stage of Charge | 2.1 | 2.2 | 2.1 |
| Voltage (V) at Final Stage of Charge | 2.2 | 2.4 | 2.3 |
| Voltage (V) at Initial Stage of Discharge | 1.9 | 1.5 | 1.7 |
| Discharge[*1] Duration (min) | 57 | 48 | 50 |
| Coulombic[*2] Efficiency (%) | 95 | 80 | 83 |
| Remarks | Good Moldability | Carbon Powders was Generated During the Molding Operation | Carbon Powders was Generated During the Molding Operation |

[*1] The discharge was cut off at zero volt. The discharge duration was an interval of time until zero volt was reached.
[*2] Coulombic efficiency = quantity of discharge electricity/quantity of charge electricity As the result of fourth and fifth preferred embodiments, the activated charcoal fiber ACC 509-20 of the novoloid type of the phenol resin series indicated a superior characteristic in the activity when any arbitrary electrode substrate material was used. Especially, the activated charcoal fiber ACC 509-20 indicated a superior electrochemical reactivity to the other activated charcoal fibers due to the large relative surface area that it has. Consequently, the inventors admitted that it was reasonable for the activated charcoal fiber ACC 509-20 to be used as the surface treatment material of the positive electrode in the zinc-halogen secondary battery.

EFFECT

Since the phenol resin series activated charcoal fiber sheets have large relative surface areas, large adsorption quantities, and pores whose diameters have distribution peaks from 1.5 nm to 3.5 nm, they indicate good electrochemical reactions for active materials in the electrolytes. In addition, since the above-described activated charcoal fiber sheets have large percentage elongations and small modulus of elasticity, they are flexible and have good workabilities.

As described above, since the phenol resin series activated charcoal fibers have higher tensile strength and tensile modulus than the rayon and acryl series carbon fiber sheet, they can only withstand mechanical pressure and heat under which surface treatment materials of electrodes used in zinc-halogen secondary batteries are adhered to the electrode substrate material but also achieve better battery characteristics due to remarkably larger surface areas of the carbon fiber sheets themselves.

Table 5 shows general characteristics of each typical activated charocal fiber sheet.

TABLE 5

| characteristics | Phenol Resin Series | Rayon Series | Acryl Series | Granulated Carbon |
|---|---|---|---|---|
| Fiber diameter ($\mu$m) | 9 to 11 | 15 to 20 | 6 to 8 | — |
| Relative Surface Area ($m^2/g$) | 1500 to 2000 | 1400 | 900 | 800 |
| Pore Diameter (nm) | 1.5 to 3.5 | 114 | 1.0 | 1.5 to 2.5 |
| Tensile Strength ($kg/mm^2$) | 30 to 40 | 5 to 10 | 30 | — |
| Tensile Modulus ($kg/mm^2$) | 1000 to 1500 | — | 7000 to 8000 | — |

SI unit: $kg/mm^2 = 9.807$ MPa

The above-described surface treatment electrodes in which one of the phenol resin series activated charcoal carbon fiber sheet having its weight per unit area equal to or more than 100 g/m$^2$, pore diameters whose distribution peaks are 1.5 to 3.5 nm and whole relative surface area equal to or more than 1500 m$^2$/g are used as the positive electrode surface treatment materials according to the present invention has the following superior characteristics than the surface treated electrodes as the treatment materials of which activated charcoal fiber sheets belonging to any one of rayon series, cellulose series, and acryl series are used.

(1) Since the phenol resin series activated charcoal fibers manufactured by Nihon Kynol Company Limited as described above have larger halogen (bromine) holding capacities than the cellulose series, rayon series, and acryl series activated charcoal fibers, the actual characteristics thereof when they are adhered to the conductive electrode substrates are remarkably improved and especially the discharge characteristics required for the secondary batteries were remarkably improved.

(2) Since the activated charcoal fibers manufactured by Nihon Kynol Company Limited have high mechanical strength, i.e., high tensile strength and low tensile modulus in their fibers themselves, the fibers are seldom destroyed during the adhering process under mechanical pressure and heat to the conductive electrode substrate. Consequently, the carbon plastic electrode having a large relative surface area and to which such an activated charcoal fiber is adhered under mechanical pressure and heat in a metallic die can properly be manufactured.

Furthermore, the electrodes in which the activated charcoal fibers whose originating raw materials are the phenol resin series novoloid fibers are adhered to the glassy carbons in a conventional method can achieve superior characteristics than those in which the activated charcoal fibers of the other PAN series or rayon series are adhered to the conductive electrode substrates. In addition, the electrodes having the three-layer constructions using the activated charcoal fibers whose originating raw materials are the penol resin series novoloid fibers, C/C composites, and ion exchange fibers exhibit proper electrode characteristics such that discharge durations are longer than those manufactured using the PAN series or rayon series activated charcoal fibers.

It will clearly be understood by those skilled in the art that the foregoing description is made in terms of preferred embodiments and various changes and modifications are made without departing from the scope of the present invention which is to be defined by the appended claims.

What is claimed is:

1. A surface treated electrode for a zinc-halogen secondary battery, comprising:
    (a) an electrically conductive material made of a carbon plastic formed in a sheet shape with a conductive carbon powder and thermoplastic constituting a substrate of the electrode; and
    (b) a surface treatment material integrally formed on the conductive electrode substrate material under a heat and pressure adhesion, the surface treatment material satisfying predetermined characteristics such that a weight per unit area thereof is at least about 100 g/m$^2$, pore diameter distribution peak is about from 1.5 nm to 3.5 nm, a surface area of a part occupied by pores whose diameters are about from 1 nm to 11 nm is at least about 30 m$^2$/g, a tensile strength is at least about 294 MPa, and a tensile modulus is up to about 14710.5 MPa.

2. The surface treated electrode as set forth in claim 1 wherein the surface treatment material is made of a phenol resin series activated charcoal fiber.

3. The surface treated electrode as set forth in claim 1, wherein said conductive electrode substrate material is a glassy carbon.

4. The surface treated electrode as set forth in claim 1, wherein said conductive substrate material is a carbon plastic.

5. The surface treated electrode as set forth in claim 1, wherein said conductive substrate material comprises a Carbon-Carbon composite material, to one surface of which the surface treatment material is adhered and to the opposite surface of which an ion exchange fiber is adhered.

6. The surface treated electrode as set forth in claim 4, wherein the phenol resin series activated charcoal fiber is adhered onto the carbon plastic material under mechanical pressure and heat.

7. The surface treated electrode as set forth in claim 4, wherein the phenol resin series activated charcoal fiber is attached onto the carbon plastic material surface.

8. The surface treated electrode as set forth in claim 1, wherein the surface treated electrode is a positive electrode of a zinc-halogen secondary battery.

9. The surface treated electrode as set forth in claim 8, wherein the surface treated electrode is a positive electrode of a zinc-bromine secondary battery.

10. A surface treated electrode for a positive electrode of a zinc-halogen secondary battery, comprising:
    (a) an electrically conductive material made of a carbon plastic formed in a sheet shape with a conductive carbon powder and thermoplastic constituting a substrate of the positive electrode; and
    (b) a surface treatment material integrally formed on the conductive substrate material under a heat and pressure adhesion, the surface treatment material having predetermined characteristics such that a weight per unit area thereof is at least about 100 g/m$^2$, pore diameter distribution peak is about from 1.5 nm to 3.5 nm, a surface area of a part occupied by pores whose diameters are about from 1 nm to 11 nm is at least about 30 m$^2$/g, a tensile strength is at least about 294 MPa, and a tensile modulus is up to about 14710.5 MPa.

11. The surface treated electrode as set forth in claim 10, wherein the electrically conductive material comprises a carbon plastic which has a weight ratio of polyethylene to carbon black of about 100:50 and onto which the surface treatment material is adhered under predetermined mechanical pressure and heat.

12. The surface treated carbon plastic electrode as set forth in claim 10, wherein the electrically conductive electrode substrate material comprises a carbon plastic which has a weight ratio of polyethylene, carbon black, and graphite of about 50:15:35 and onto which the surface treatment material is adhered under a predetermined mechanical pressure and predetermined temperature using a predetermined die for a predetermined interval of time.

13. The surface treated electrode as set forth in claim 12, wherein the predetermined pressure is about 5.88 MPa, the predetermined temperature is about 140° C., and the predetermined interval of time is about three minutes.

14. The surface treated electrode as set forth in claim 12, wherein the surface treatment material is the phenol resin series activated charcoal fiber derived from an activation and sintering of a novoloid of phenol formaldehyde under vaporized water after a melt spinning of the novoloid.

15. The surface treated carbon plastic electrode as set forth in claim 12, wherein the surface treatment material is cloth and has a weight per unit area in a unit of sheet of about 135 g/m$^2$, a thickness of about 0.53 mm, relative surface area of about 1500 m$^2$/g, pore diameter of about from 1.5 nm to 3.5 nm.

16. The surface treated electrode as set forth in claim 15, wherein the carbon plastic electrode substrate material has a thickness of about 1.50 mm, a resistivity of about 0.168 $\Omega$-cm, a relative surface area of about 995 m$^2$/g, and a tensile strength of about 3129.205 MPa.

17. The surface treated electrode as set forth in claim 10, wherein the positive electrode surface treatment material is the phenol resin series activated charcoal fiber having a weight per unit area in a unit of sheet of about 100 g/m$^2$, a thickness of about 2.20 mm, a relative surface area of about 2000 m$^2$/g, pore diameters ranging from about 1.5 nm to 3.5 nm and a felt form.

18. The surface treated electrode for a positive electrode of a zinc-halogen secondary battery as set forth in claim 17, wherein the zinc-halogen secondary battery includes: the positive electrode constituted by the conductive electrode substrate material comprising the carbon plastic having a weight ratio of polyethylene to carbon black of about 100:50 and onto the surface of which the positive electrode surface treatment material is adhered under mechanical pressure and heat; a negative electrode formed of zinc plate; and an electrolyte of $ZnBr_2$ having a concentration of about 3 mol/l and the zinc-halogen secondary battery has an interelectrode distance of 10 mm without an electrode separating member and wherein the zinc-halogen secondary battery including the phenol resin series activated charcoal fiber of the surface treatment material has a higher discharge voltage and longer discharge duration than the zinc-halogen secondary battery including the phenol resin series activated charcoal fiber of the positive electrode surface treatment material, said positive electrode surface material comprising cloth having a weight per unit area in a unit of sheet of about 115 g/m$^2$, a thickness of about 0.44 mm, a relative surface area of about 2000 m$^2$/g, pore diameters ranging from 1.5 nm to 3.55 nm when both zinc-halogen secondary batteries are charged for one hour at current densities of 20 mA/cm$^2$ and discharged with the same electrolytes renewed.

19. The surface treated electrode as set forth in claim 10, wherein the conductive electrode substrate material comprises a glassy carbon onto which a sheet of the activated charcoal fiber phenol resin series having a predetermined characteristic such that a weight per unit area is 170 g/m$^2$, a thickness is 0.60 mm, a relative surface area is 2000 m$^2$/g, a pore diameter ranges from 1.5 nm to 3.5 nm, and fiber form is of a cloth form is laminated via a condutive carbon paste.

20. The surface treated electrode as set forth in claim 10, wherein the conductive electrode substrate material comprises a Carbon-Carbon composite material, to one surface of which the phenol resin series activated charcoal fiber is adhered as the surface treatment material and to the opposite surface of which an ion exchange fiber is adhered and which further comprises a rolled zinc plate as a negative electrode having a purity of 99.99% and an electrolyte of 3 mol/l $ZnBr_2 + Br_2$.

* * * * *